US010386135B2

(12) United States Patent
Shin (10) Patent No.: US 10,386,135 B2
(45) Date of Patent: Aug. 20, 2019

(54) COOLING TOWER INTEGRATED INLET LOUVER FILL

(71) Applicant: Baltimore Aircoil Company, Inc., Jessup, MD (US)

(72) Inventor: Yoon K. Shin, Ellicott City, MD (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 95 days.

(21) Appl. No.: 15/472,998

(22) Filed: Mar. 29, 2017

(65) Prior Publication Data

US 2017/0198992 A1 Jul. 13, 2017

Related U.S. Application Data

(63) Continuation of application No. 14/529,941, filed on Oct. 31, 2014.

(51) Int. Cl.
| | |
|---|---|
| *A23C 3/04* | (2006.01) |
| *F28F 25/08* | (2006.01) |
| *F28C 1/02* | (2006.01) |
| *F28C 1/04* | (2006.01) |
| *F28C 1/00* | (2006.01) |
| *B01J 19/32* | (2006.01) |

(52) U.S. Cl.
CPC .............. *F28F 25/087* (2013.01); *F28C 1/02* (2013.01); *F28C 1/04* (2013.01); *B01J 19/32* (2013.01); *B01J 2219/32248* (2013.01); *B01J 2219/32251* (2013.01); *F28C 2001/006* (2013.01)

(58) Field of Classification Search
CPC .... B01J 2219/32248; B01J 2219/32251; B01J 19/32; F28C 2001/006; F28F 25/087

USPC ........................................................ 165/115
See application file for complete search history.

(56) References Cited

U.S. PATENT DOCUMENTS

| | | | |
|---|---|---|---|
| 3,260,511 A | 7/1966 | Greer | |
| 3,281,307 A | 10/1966 | Moeller et al. | |
| 3,540,702 A | 11/1970 | Uyama | |
| 3,733,063 A * | 5/1973 | Loetel | F28F 25/087 |
| | | | 261/112.2 |

(Continued)

FOREIGN PATENT DOCUMENTS

| | | |
|---|---|---|
| CN | 1257992 A | 6/2000 |
| CN | 1286389 A | 3/2001 |

(Continued)

OTHER PUBLICATIONS

Translation of CN 102341668 A entitled Translation—CN 102341668 A.*

(Continued)

*Primary Examiner* — Paul Alvare
(74) *Attorney, Agent, or Firm* — Fitch, Even, Tabin & Flannery LLP (57) ABSTRACT

A fill sheet arrangement in a direct heat exchange section of a cooling tower is provided. Each fill sheet includes ridges, grooves, separators, and an air inlet louver zone itself having ridges, grooves and separators, that improve the performance of the fill sheet arrangement when installed as a direct heat exchange section of a cooling tower. The air inlet louver zone improves the air flow capabilities and performance of the direct heat exchange section by limiting the evaporative liquid from leaving the fill sheet.

6 Claims, 6 Drawing Sheets

(56) References Cited

U.S. PATENT DOCUMENTS

| | | | |
|---|---|---|---|
| 3,775,234 A | 11/1973 | Rich | |
| 3,952,077 A * | 4/1976 | Wigley | B01J 19/32 261/112.2 |
| 3,963,810 A * | 6/1976 | Holmberg | B01J 19/32 261/112.2 |
| 4,344,899 A | 8/1982 | Monjoie | |
| 4,361,426 A * | 11/1982 | Carter | F28F 25/087 261/112.2 |
| 4,395,448 A * | 7/1983 | Lefevre | B29C 65/56 428/99 |
| 4,518,544 A * | 5/1985 | Carter | B01J 19/32 261/112.2 |
| 4,548,766 A | 10/1985 | Kinney, Jr. et al. | |
| 4,553,993 A * | 11/1985 | Wigley | B01D 45/06 210/150 |
| 4,657,711 A * | 4/1987 | Wigley | B01J 19/32 261/112.2 |
| 4,670,197 A | 6/1987 | Stackhouse | |
| 4,800,047 A | 1/1989 | Monjoie | |
| 4,915,165 A | 4/1990 | Dahlgren et al. | |
| 4,981,621 A | 1/1991 | Pluss | |
| 5,413,872 A * | 5/1995 | Faigle | B01F 5/0643 165/166 |
| 5,474,832 A | 12/1995 | Massey | |
| 6,206,350 B1 | 3/2001 | Harrison et al. | |
| 6,260,830 B1 | 7/2001 | Harrison et al. | |
| 6,869,066 B2 | 3/2005 | Koo | |
| 7,491,325 B2 | 2/2009 | Kulick et al. | |
| 9,170,054 B2 | 10/2015 | Shin et al. | |
| 2003/0035928 A1 * | 2/2003 | Aull | B01J 19/32 428/174 |
| 2014/0251586 A1 | 9/2014 | Persson | |
| 2015/0034277 A1 | 2/2015 | Shin | |
| 2015/0336080 A1 * | 11/2015 | Krell | B01J 19/32 29/428 |
| 2016/0223262 A1 | 8/2016 | Shin | |

FOREIGN PATENT DOCUMENTS

| | | | |
|---|---|---|---|
| CN | 102341668 A * | 2/2012 | F28C 1/04 |
| CN | 104034189 | 9/2014 | |
| DE | 19819945 A1 | 11/1999 | |
| EP | 0056911 A2 | 8/1982 | |
| EP | 0529422 A1 | 3/1993 | |
| EP | 1689013 | 8/2006 | |
| EP | 1992898 A1 | 11/2008 | |
| GB | 2258524 A | 2/1993 | |
| JP | S4825349 B | 7/1973 | |
| JP | S5044760 U | 4/1975 | |
| JP | H024196 A | 1/1990 | |
| JP | H06509862 | 11/1994 | |
| JP | 2000180074 A | 6/2000 | |
| JP | 2001255099 A | 9/2001 | |
| JP | 2005156037 | 6/2005 | |
| JP | 2011137606 A | 7/2011 | |

OTHER PUBLICATIONS

Chinese Office Action with English translation from Chinese Patent Application No. 201510725631.4, dated Aug. 3, 2018; 8 pages.
Chinese Office Action with English translation from Chinese Patent Application No. 201510725631.4, dated Jan. 4, 2018; 8 pages.
Chinese Office Action with English translation from Chinese Patent Application No. 201510725631.4, dated Mar. 30, 2017; 11 pages.
Images of prior art fill devices publicly available before Oct. 31, 2014, 3 pages.

* cited by examiner

COOLING TOWER INTEGRATED INLET LOUVER FILL

This application is a continuation-in-part of U.S. application Ser. No. 14/529,941, filed Oct. 31, 2014.

BACKGROUND OF THE INVENTION

The present invention relates to air inlet louver zone of heat and mass transfer media, or fill sheet arrangement within the direct heat exchange portion of a cooling tower. More particularly, the present invention relates to inlet louver zone attached to a fill sheet that is used in a direct heat exchange unit, which could be a cooling tower.

The heat and mass transfer media, or fill sheet arrangement, is generally vertically oriented with an evaporative liquid, usually water, coursing over the material, usually flowing downwardly, with an air stream directed usually transversely but potentially concurrent or cross current through the spaced fill sheet direct cooling section. The air interacts with the evaporative liquid for heat and mass transfer.

The integrated air inlet louver zone, hereafter called louver zone, is attached to an edge of fill sheet, is a part of fill sheet, directs airstream to fill sheet, and limits evaporative fluid from leaving the fill sheet beyond the fill sheet edge.

When a pair of fill sheets are stacked a gap forms between two fill sheets' evaporative areas but a plurality of air tunnels forms between two fill sheets' louver zones. These air tunnels, which are generally hexagonal in shape, form a straight pattern that matches well to the gap contour between the pair of fill sheets. Multiple repeats of the pair of fill sheets form a fill pack, and multiple repeats of a pair of louver zones form a louver pack within a fill pack.

The louver pack prevents evaporative liquid from splashing out of the fill pack. The louver zone's plurality of ridges and grooves are sloped downward toward the evaporative area so that the evaporative liquid that is splashed on to the louver zone is flowed back toward the evaporative area of the fill pack.

To prevent evaporative liquid from falling between two adjacent louver zones, one louver zone's plurality of ridges must align and touch adjacent louver zone's plurality of grooves so that there is no gap between the plurality of ridges and the plurality of grooves. Otherwise, two adjacent louver zones can nest and a large gap between louver zones can form within the louver pack. In this invention, during stacking, two adjacent inlet louvers are guided into an aligned location by the male indexer of the first louver zone riding on one of the guide walls of the second louver zone so that a plurality of fill sheet spacers located in the evaporative area can easily lock in the fill sheets in place with respect to each other.

For best thermal performance of a cooling tower, it is critical that the evaporative areas of the fill pack receive well distributed air streams from their louver pack. In this invention, a plurality of male indexers within the louver pack is designed so the male indexers can be positioned inside the plurality of air tunnels while preserving both the hexagonal shape and the straight pattern of a plurality of air tunnels that match so well to the gap opening shape of the evaporative areas.

For best thermal performance of a cooling tower, it is also critical that louver pack's plurality of indexing features does not incur significant air pressure drop by blocking the cooling air that travels toward the evaporative areas of the fill pack. Air pressure drop is caused by traveling air blocked by an object with a cross sectional area. A larger cross sectional area blocks more air and causes higher pressure drop. This invention uses a plurality of recessed ridges in the louver pack to decrease the size of overall cross sectional area of plurality of indexing features. A recessed ridge is located inside one of plurality of air tunnels that also houses one of plurality of male indexers. The recessed ridge lowers a small portion of the ridge of the air tunnel so that the male indexer inside the air tunnel does not have to be so tall to reach the ridge of the air tunnel. A shorter male indexer has a smaller cross sectional area, when viewed from the air tunnel opening, than a taller male indexer, and the smaller cross sectional area allows larger air passageways on both sides of shorter male indexer. A small increase in the air blockage by adding of the recessed ridge in the air tunnel is more than offset by the large increase in the air passageways. Because fill sheets, which include louver zones and a plurality of male indexers, are made from thermal forming of thin sheets of plastic, all of the fill sheet features require a draft angle of a minimum of 15°~17°. By using the recessed ridge, the cross sectional area of the male indexers can be decreased while maintaining the minimum draft angle.

In order to further reduce the pressure drop within the air tunnel, this invention also uses curved ridge cutouts and air bypasses. In one of plurality of air tunnels that houses a male indexer, a pair of curved ridge cutouts is made to two opposing tunnel walls near the base of the male indexer. These curved ridge cutouts in the air tunnel increase the size of air passageways and allow air to go around the male indexer freely and with only a minimum air pressure drop. These curved ridge cutouts start near the base of a male indexer and opens up toward the plane of a plurality of ridges at an angle that ranges from 30° to 60° such that a portion of the two ridges at the top of the curved ridge cutouts are lowered slightly and two bypass openings are formed between the male indexer tunnel and its two adjacent tunnels. These two bypass openings allow air to travel through from two adjacent tunnels to the male indexer tunnel so that the air distribution going into the fill pack is better maintained than the design without the bypass openings.

SUMMARY OF THE INVENTION

The invention made improvements to the air inlet louver zone included in the fill sheet near the first side edge of the fill sheet arrangement. Each fill sheet includes an air inlet louver zone comprised of a plurality of gradually raised surfaces that lead to form a plurality of raised ridges of each fill sheet. A pair of air inlet louver zones stacked together forms a plurality of air tunnels between two air inlet louver zones.

The invention made improvements, more specifically, to the indexing feature inside one of plurality of air tunnels. The invention' indexing feature comprises a male indexer that aids alignment of louver zones during stacking, a pair of curved ridge cutouts made to the air tunnel walls in order to both minimize the air pressure drop and create bypass openings to adjacent tunnels, a recessed ridge to minimize the cross sectional area of the male indexer in order to minimize the air tunnel blockage thereby increasing the size of air passageways, and two guide walls that are attached to the recessed ridge to guide the male indexer toward the recessed ridge. These components working together improve the stacking of the fill sheets while maintaining the nice distribution of air streams going into the fill pack's evaporative area.

DESCRIPTION OF THE PREFERRED EMBODIMENT

Figure 1:
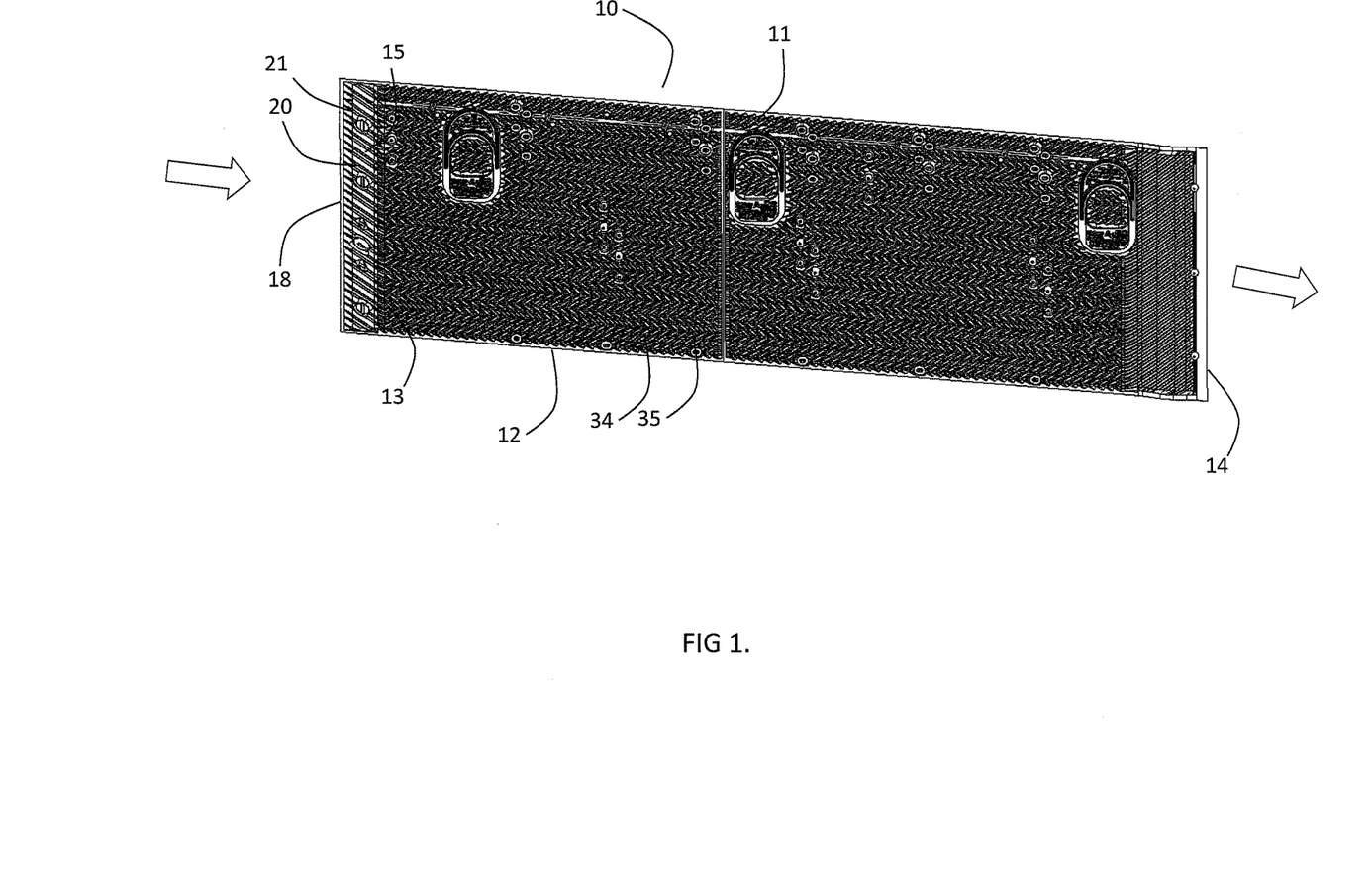
FIG. 1 is a side view of a first fill sheet in accordance with an embodiment of the present invention.

Referring now to FIG. 1 of the drawings, a first fill sheet is shown at 10 and a first inlet louver zone is shown at 15. First fill sheet 10 is shown to be of a generally rectangular and generally planar structure; however, it should be understood that based on design of installation needs first fill sheet 10 may be of a square or trapezoidal structure as well. First fill sheet 10 is seen to comprise a top edge 11, bottom edge 12, first side edge 18, and second side edge 14. Cooling air typically enters from the direction of first side edge 18 and travels and exits towards the general direction of second side edge 14. Included in first fill sheet 10 is first inlet louver zone 15 extending from first inlet edge 18 to first transition edge 13. It is noted that first transition edge 13 may be straight or curved. First inlet louver zone 15 is shown to be of a generally rectangular and generally planar structure; however, it should be understood that based on the design of installation needs first inlet louver zone 15 may be of a square or trapezoidal structure as well. First inlet louver zone 15 extends from first side edge 18 to first transition edge 13 and from top edge 11 to bottom edge 12. Generally, when installed in a direct heat exchange unit, possibly as a component of a cooling tower, evaporative liquid, usually water, flows downwardly onto top edge 11 and across first fill sheet 10, and exits bottom edge 12. First side edge 18 is typically an air inlet edge wherein air is forced or drawn cross-current to the evaporative liquid downward flow to exit from second side edge 14. Such combination of evaporative liquid generally flowing down and cross-current air flow acts to remove heat from the evaporative liquid by both a heat and mass transfer operation. It should be understood that air flow may be somewhat counter current or con-concurrent with the evaporative liquid downward flow, depending on the design of the direct heat exchange unit.

Each first fill sheet 10 including first inlet louver zone 15 is usually comprised of polyvinyl chloride, polypropylene, or any other plastic sheet formed in a press, vacuum forming, or molding operation.

First fill sheet 10 is seen to comprise of a plurality of first fill sheet ridge 34 on the rear surface of first fill sheet 10 extending from first transition edge 13 to second side edge 14. Alternating with first fill sheet ridges 34 are first fill sheet grooves 35.

First inlet louver zone 15 is also seen to comprise of a plurality of first ridges 20 extending length wise from first side edge 18 to first transition edge 13 matching the shapes of a plurality of first fill sheet ridge 34. Alternating with first ridge 20 are first grooves 21, which also extend lengthwise across first inlet louver zone 15 from first side edge 18 to first transition edge 13 at an inclined angle.

Figure 2:
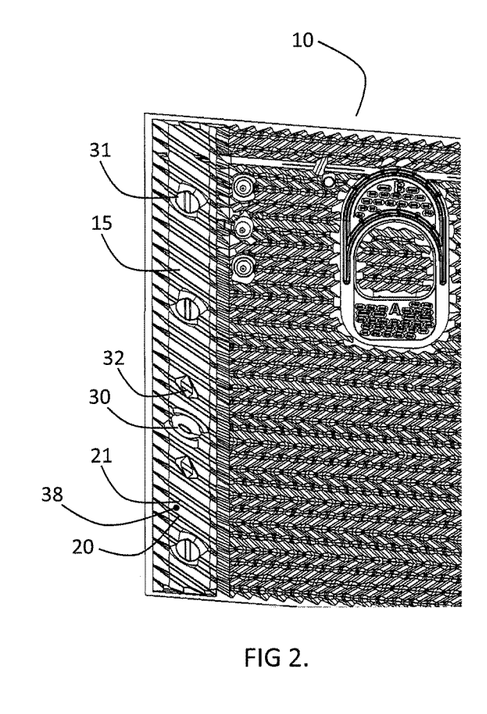
FIG. 2 is a partial view of a first inlet louver zone showing a male indexer and adjacent raised surfaces in accordance with an embodiment of the present invention.
Figure 2A:
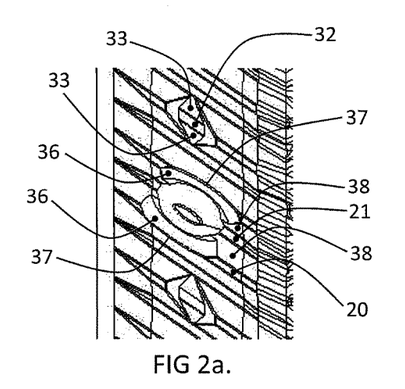
FIG. 2a is a partial view of a first inlet louver zone showing an enlarged plan view of a male indexer and adjacent raised surfaces in accordance with an embodiment of the present invention.
Figure 2B:
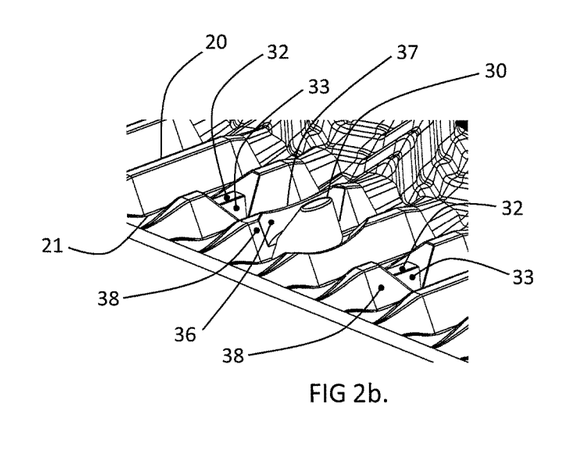
FIG. 2b is a partial view of a first inlet louver zone showing an enlarged isometric view of a male indexer and adjacent raised surfaces in accordance with an embodiment of the present invention.

Referring now to FIG. 2, FIG. 2a, and FIG. 2b, first fill sheet 10 is shown and first louver zone 15 is also seen to comprise a first male indexer 30, first male separators 31, and first recessed ridges 32. FIG. 2a is an enlarged figure of an area near first male indexer 30, and FIG. 2b is an isometric view of an enlarged figure of an area near first male indexer 30.

A plurality of alternating first groove 21 and first ridge 20 cover most of first louver 15. Connecting a plurality of first ridge 20 to a plurality of first groove 21 are a plurality of air tunnel walls 38.

First male indexer 30 extends upwardly from one of a plurality of first groove 21 past the plane of a plurality of first ridge 20. The height of first male indexer 30 is discussed more in FIG. 6A description section.

First male separator 31 extends upwardly from the plane of a plurality of first groove 21 until the top flat surface of first male separator is flushed with first ridge 20. Each first male separator 31 is located generally in the middle of one of plurality of first ridge 20. First male separator 31 are generally spaced from 3 to 6 inches apart.

First recessed ridges 32 extends upwardly from the plane of a plurality of first groove 21 to slightly lower than a plurality of first ridge 20. There are two first guide walls 33 per each first recessed ridge 32. More about first guide wall 33 is discussed in FIG. 6A description section.

There are two first curved ridge cutouts 36 on each side of first male indexer 30, and first curved ridge cutouts 36 are made by gauging out air tunnel walls 38 adjacent first male indexer 30 until a portion of first ridge 20 is lowered to form locally lowered ridge 37. First recessed ridge 32 and its two accompanying first guide walls 33 are shown clearly. The angle between first guide wall 33 and the plane of the plurality of first groove 21 is between 30° and 60°.

Figure 3:
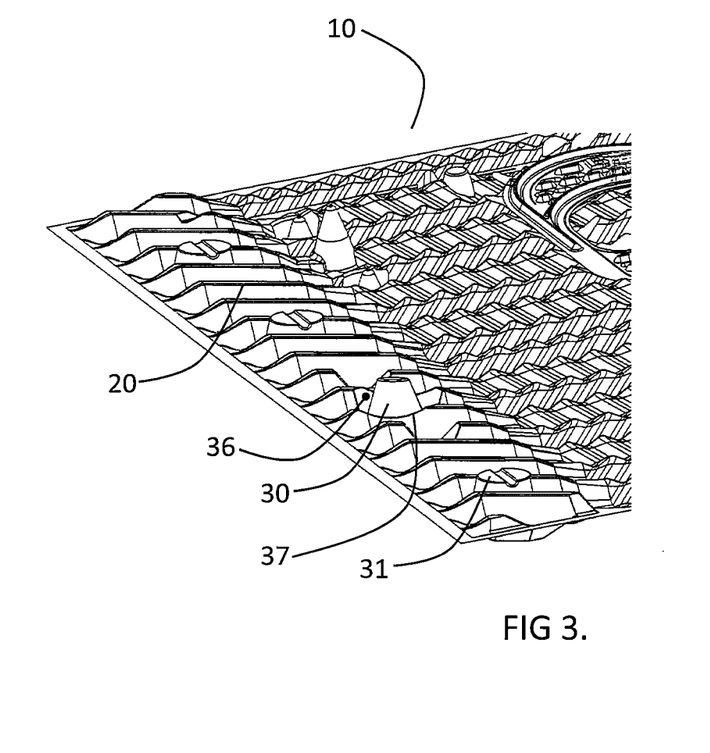
FIG. 3 is a partial view of a first inlet louver zone showing a male indexer and curved ridge cutouts in adjacent raised surfaces in accordance with an embodiment of the present invention.

Referring now to FIG. 3, first fill sheet 10 is shown with a plurality of first ridge 20 and first curved ridge cutout 36 on two adjacent first ridges 20 of first male indexer 30.

Figure 4:
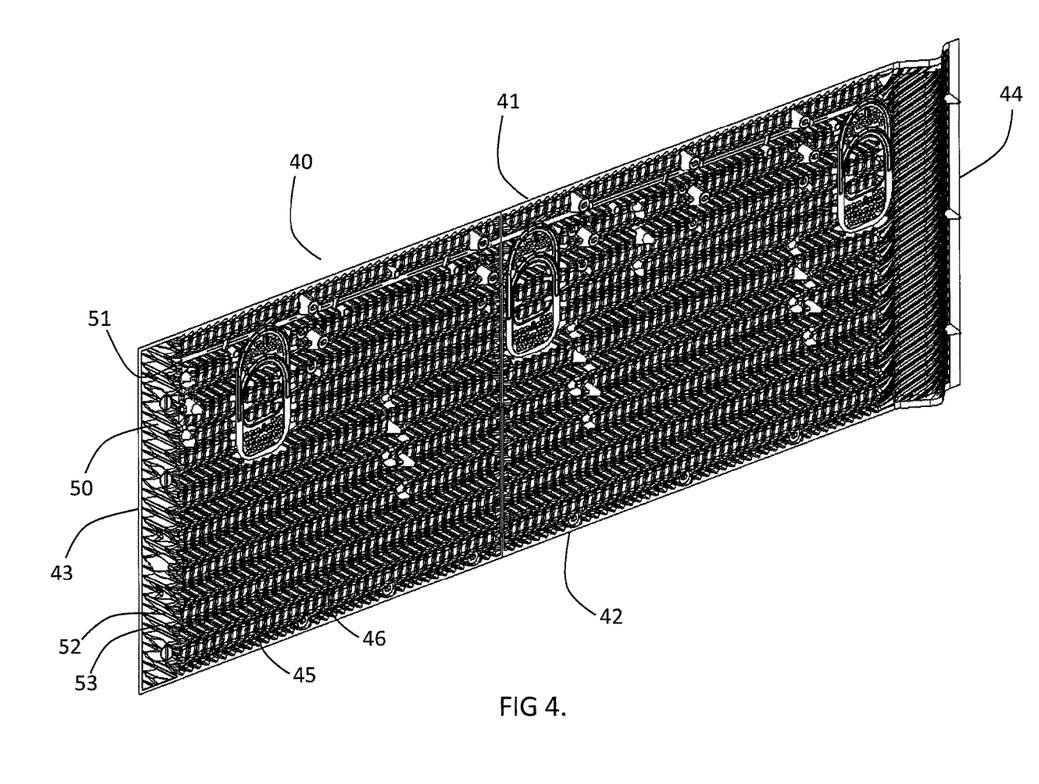
FIG. 4 is a perspective side view of a second fill sheet in accordance with an embodiment of the present invention.

Referring now to FIG. 4, second fill sheet 40 is shown.

First fill sheet 10 and second fill sheet 40 could be identical. Therefore, details shown in FIG. 2a and FIG. 2b could also be applied to second fill sheet 40. By making these sheets identical and by stacking them in the same orientation except one sheet slightly shifted from another so that an air gap could be formed between sheets as shown in US 2015/0034277, the manufacturing cost could be reduced.

Similar to first fill sheet 10, second fill sheet 40 is a generally rectangular, generally planar structure, having top edge 41, bottom edge 42, first side edge 43, and second side edge 44.

Included in second fill sheet 40 is second inlet louver zone 50 extending from first inlet edge 43 to transition edge 51 and from top edge 41 to bottom edge 42. It is noted that transition edge 51 may be straight or curved. Second inlet louver zone 50 is seen to be quite similar to first inlet louver zone 15 in that second inlet louver zone is shown to be of a generally rectangular and generally planar structure; however, it should be understood that based on design of installation needs second inlet louver zone 50 may be of a square or trapezoidal structure as well.

Second fill sheet 40 including second inlet louver zone 50 is again quite similar or identical to first fill sheet 10 there to in being comprised of polyvinyl chloride, polypropylene, or any other plastic sheet made in a pressing, vacuum forming, or molding operation.

Further, second fill sheet 40 is seen to comprise a series of second fill sheet ridges 45 on the front surface of second fill sheet 40 and alternating series of second fill sheet grooves 46 on the front surface of second fill sheet 40. Second fill sheet ridges 45 extend lengthwise from transition edge 51 to second side edge 44 and second fill sheet grooves 46 extend lengthwise from transition edge 51 to second side edge 44.

Second inlet zone 50 is seen to comprise a series of second ridges 52 extending from first edge 43 to transition edge 51. Similarly, second inlet zone 50 is seen to comprise a series of second groove 53 extending from first edge 43 to transition edge 51. Second ridge 52 aligns with second fill sheet ridge 45 and second groove 53 aligns with second fill sheet groove 46.

Figure 5:
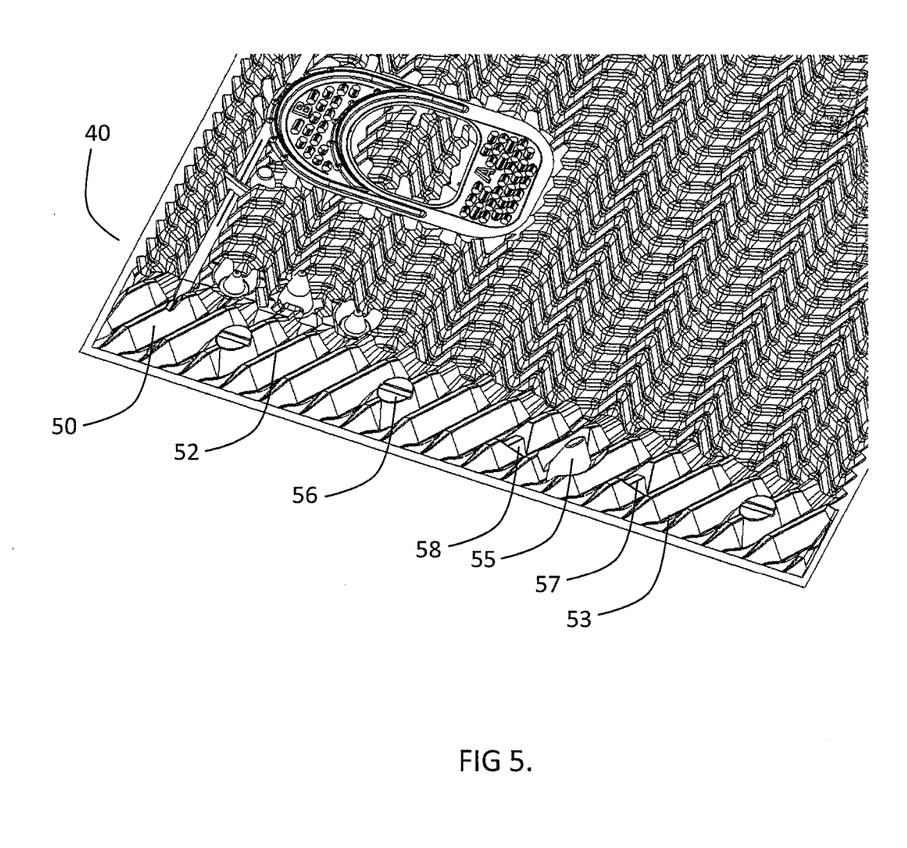
FIG. 5 is a partial view of a second fill sheet showing second inlet louver zone in accordance with an embodiment of the present invention.

Referring now to FIG. 5, second fill sheet 40 has second inlet louver zone 50, which is also seen to comprise a second male indexer 55, second male separators 56, and second recessed ridges 57.

Second male indexer 55 extends upwardly from the surface of second inlet louver zone 50. As to be further explained, second male indexer 55 is typically located on one of plurality of second grooves 53 on the front surface of second inlet louver zone 50.

Second male separator 56 extends upwardly from the surface of second inlet louver zone 50. As to be further explained, the extended surface of second male separator 56 is typically flushed with the plane of a plurality of second ridge 52, and the center of second male separator 56 is typically located on second ridge 52 on the front surface of second inlet louver zone 50.

Second recessed ridge 57 extends upwardly from the surface of second inlet louver zone 50 to slightly lower than second ridge 52. Second guide wall 58 connects second groove 53 to second recessed ridge 57.

In practice, a fill arrangement in a direct heat exchange unit would be comprised of two fill sheets, first fill sheet 10 and second fill sheet 40, located adjacent each other and repeated multiple times as needed to form a fill pack, which is a direct heat exchanger. Subsequently, two inlet louver zones included in the two fill sheets would also be located adjacent each other and repeated multiple times as needed.

In many cases first fill sheet 10 and second fill sheet 40 could be identical. By making these two fill sheets identical, one thermal forming mold could be used to produce both first fill sheet 10 and second fill sheet 40, and the manufacturing cost could be reduced.

Figure 6A:
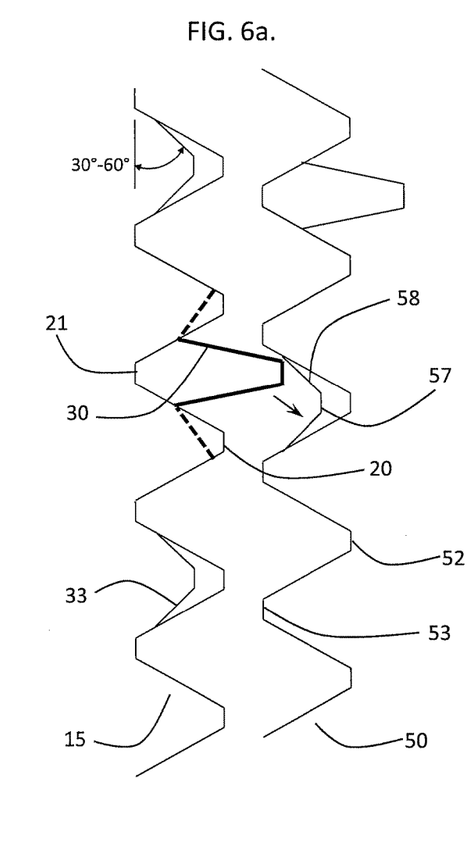
FIG. 6A is a schematic view of a portion of a first and second inlet louver zone showing a male indexer in accordance with an embodiment of the present invention.

Referring now to FIG. 6a, schematics are shown wherein a portion of first inlet louver zone 15 is seen to be adjacent a portion of second inlet louver zone 50. First inlet louver zone 15 has a plurality of first ridges 20 and a plurality of first grooves 21. Second inlet louver zone 50 has a plurality of second ridges 52 and a plurality of second grooves 53.

First male indexer 30 is seen to extend from one of plurality of first groove 21 of first inlet louver zone 15 toward one of second recessed ridges 57 of second inlet louver zone 50. During the assembly process of stacking first inlet louver zone 15 and second inlet louver zone 50, as first male indexer 30 travels toward second inlet louver zone 50, second guide wall 58 guides first male indexer 30 toward second recessed ridge 57 thereby shifting aligning first inlet louver zone 15 to second inlet louver zone 50.

Figure 6B:
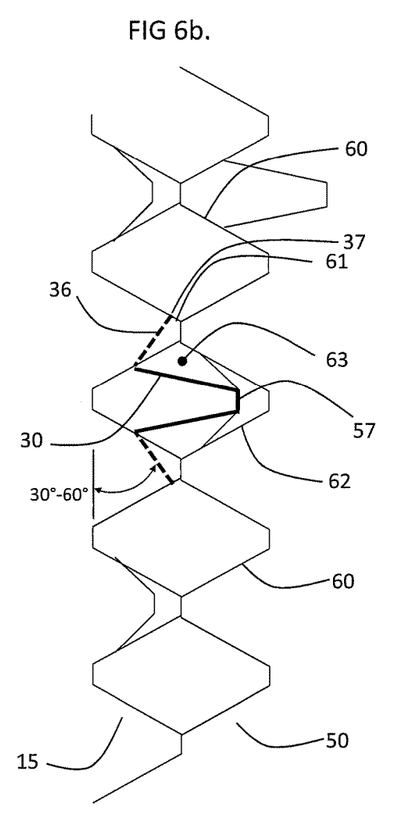
FIG. 6B is a view of a portion of a first and second inlet louver zone showing a male indexer in accordance with an embodiment of the present invention.

FIG. 6b shows the desired location of first inlet louver zone 15 with respect to second inlet louver zone 50 where first male indexer 30 contacting second recessed ridge 57. Air travels through a plurality of air tunnels 60 created by adjacent first inlet louver zone 15 and second inlet louver zone 50, but for air tunnel 62 that is partially blocked by first male indexer 30 a pair of first curved ridge cutouts 36 allows air to go around first male indexer 30 through enlarged air passageway 63 without significant air pressure drop. Each of first curved ridge cutouts 36 also creates an air bypass opening 61 between one of locally lowered ridges 37 and one of plurality of second groove 53 on either side of male indexer 30 so that air traveling inside two adjacent air tunnels 60 can enter air tunnel 62 and equalize the air pressure difference among three air tunnels.

What is claimed is:

1. An indexing feature for louvers in a direct heat exchanger, the indexing feature comprising:

a first louver zone having a plurality of spaced ridges and grooves, a second louver zone adjacent the first louver zone and having a plurality of spaced ridges and grooves, wherein the ridges of the first louver zone are aligned with and adjacent the grooves of the second louver zone thereby forming a plurality of air tunnels between the first louver zone and the second louver zone;

a recessed ridge of one of the ridges of the second louver zone, the one ridge forming at least a portion of one of the air tunnels;

two guide walls of the one ridge of the second louver zone extending from the recessed ridge toward adjacent grooves of the second louver zone;

a male indexer of the first louver zone extending from one of the grooves of the first louver zone to the recessed ridge of the second louver zone, the one groove forming at least a portion of the one air tunnel;

air passageways between the male indexer and the adjacent guide walls;

two locally lowered ridges, each locally lowered ridge having a portion lowered by a respective curved ridge cutout and being situated in the first louver zone adjacent the male indexer and on opposite sides of the male indexer, two grooves of the second louver zone adjacent the recessed ridge and on opposite sides of the recessed ridge;

each of the curved ridge cutouts of the first louver zone are adjacent one of the grooves of the second louver zone; and a pair of air bypass openings each defined at least in part by one of the locally lowered ridges of the first louver zone and the adjacent groove of the second louver zone that permit airflow between the one air tunnel and adjacent air tunnels.

2. The indexing feature of claim 1 wherein the curved ridge cutouts each include an arcuate surface that guides air around the male indexer.

3. The indexing feature of claim 1 wherein the curved ridge cutouts start near a base of the male indexer and open up toward a plane of the plurality of ridges at an angle of 30 to 60 degrees.

4. The indexing feature of claim 1 wherein the two locally lowered ridges of the first louver zone each include a curved, upper edge.

5. The indexing feature of claim 1 wherein the male indexer includes a convex outer surface and the curved ridge cutouts each include a concave surface facing the convex outer surface of the male indexer.

6. The indexing feature of claim 1 wherein the plurality of ridges of the first louver zone contact the plurality of grooves of the second louver zone.

\* \* \* \* \*